United States Patent
Chen et al.

(10) Patent No.: US 10,779,051 B2
(45) Date of Patent: *Sep. 15, 2020

(54) SCREEN MIRRORING FROM PERSONAL ELECTRONIC DEVICES TO TRANSPORTATION VEHICLE DISPLAY SCREENS

(71) Applicant: Panasonic Avionics Corporation, Lake Forest, CA (US)

(72) Inventors: Tim Yuting Chen, Irvine, CA (US); Philip Watson, Lake Forest, CA (US); Steven Bates, Mission Viejo, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/836,723

(22) Filed: Dec. 8, 2017

(65) Prior Publication Data
US 2018/0295426 A1  Oct. 11, 2018

Related U.S. Application Data

(63) Continuation-in-part of application No. 15/479,538, filed on Apr. 5, 2017.

(51) Int. Cl.
*G06F 3/14* (2006.01)
*H04N 21/6334* (2011.01)
(Continued)

(52) U.S. Cl.
CPC ... *H04N 21/63345* (2013.01); *B64D 11/0015* (2013.01); *G06F 3/1454* (2013.01);
(Continued)

(58) Field of Classification Search
CPC ....... H04W 4/48; H04W 4/80; H04W 12/003; H04W 12/00305; H04W 76/14;
(Continued)

(56) References Cited

U.S. PATENT DOCUMENTS 7,624,210 B2  11/2009  Izutsu
7,710,349 B2   5/2010  De Leon
(Continued)

OTHER PUBLICATIONS

Goggle, Widevine DRM Architecture Overview, Mar. 6, 2017, pp. 1-28, Version 1.2, published online at URL: https://storage.googleapis.com/wvdocs/Widevine_DRM_Architecture_Overview.pdf.

*Primary Examiner* — Jason M Mandeville
(74) *Attorney, Agent, or Firm* — Perkins Coie LLP

(57) ABSTRACT

An entertainment system for a vehicle accommodating a passenger with a personal electronic device executing a screen sharing application. The entertainment system includes a network onboard the vehicle and information processing devices connected to the network. Each device includes a data processor, and at least one including a display monitor and a screen sharing server executed by the data processor of the device with the screen sharing server being receptive to a display data stream communicated over the network to the screen sharing server by execution of the screen sharing application of the portable electronic device. The display data stream is communicated after pairing of the screen sharing application the device. A media player application executed by the data processor of the device determines if the display data stream is encrypted. If so, the media player application requests a license and after receipt of the license, a decrypted display data stream is rendered the display monitor.

18 Claims, 7 Drawing Sheets

(51) Int. Cl.
  *H04N 21/4405* (2011.01)
  *H04N 21/414* (2011.01)
  *H04N 21/41* (2011.01)
  *H04L 29/06* (2006.01)
  *B64D 11/00* (2006.01)
  *H04L 29/08* (2006.01)
  *H04N 21/214* (2011.01)
  *H04W 84/12* (2009.01)

(52) U.S. Cl.
  CPC .......... *H04L 65/4069* (2013.01); *H04L 67/12* (2013.01); *H04N 21/2146* (2013.01); *H04N 21/4122* (2013.01); *H04N 21/4126* (2013.01); *H04N 21/41407* (2013.01); *H04N 21/4405* (2013.01); *H04W 84/12* (2013.01)

(58) Field of Classification Search
  CPC ..... H04W 76/15; H04W 84/02; H04W 84/12; G06F 3/1454; G09G 5/12; G09G 2354/00; G09G 2370/022; G09G 2370/12; G09G 2370/16; G09G 2380/12
  USPC ...................................... 345/1.1, 2.1, 2.2, 2.3
  See application file for complete search history.

(56) References Cited

U.S. PATENT DOCUMENTS

| | | | |
|---|---|---|---|
| 7,737,915 B1 | 6/2010 | Vishlitzky | |
| 8,190,799 B2 | 5/2012 | Izutsu | |
| 8,527,012 B2 | 9/2013 | Wright-Riley | |
| 8,856,838 B2 | 10/2014 | Keen et al. | |
| 8,879,987 B1 | 11/2014 | Harold | |
| 9,003,454 B2 | 4/2015 | Keen et al. | |
| 9,237,372 B2 | 1/2016 | Dey | |
| 9,348,492 B1 * | 5/2016 | Penilla | B60W 40/08 |
| 9,383,961 B2 | 7/2016 | Dusterhoff | |
| 9,420,314 B1 | 8/2016 | Dame | |
| 9,516,352 B2 | 12/2016 | Keen et al. | |
| 9,584,860 B2 | 2/2017 | Dey | |
| 9,800,670 B2 | 10/2017 | Warrick et al. | |
| 9,848,027 B2 | 12/2017 | Chen | |
| 10,001,916 B2 | 6/2018 | Bostick et al. | |
| 10,015,265 B2 | 7/2018 | Warrick et al. | |
| 2006/0136828 A1 | 6/2006 | Asano | |
| 2007/0236482 A1 | 10/2007 | Proctor et al. | |
| 2009/0119721 A1 * | 5/2009 | Perlman | H04N 7/24 725/76 |
| 2012/0188147 A1 * | 7/2012 | Hosein | H04M 1/72519 345/2.2 |
| 2013/0005336 A1 * | 1/2013 | Ayotte | H04W 4/48 455/435.1 |
| 2013/0194510 A1 | 8/2013 | Freundlich et al. | |
| 2014/0242910 A1 * | 8/2014 | Umlauft | H04L 63/107 455/41.1 |
| 2015/0334163 A1 | 11/2015 | Turner | |
| 2015/0373123 A1 | 12/2015 | Warrick et al. | |
| 2016/0027399 A1 * | 1/2016 | Wilde | G09G 5/003 345/520 |
| 2016/0173937 A1 | 6/2016 | Shih et al. | |
| 2016/0191584 A1 | 6/2016 | Dickow et al. | |
| 2016/0309532 A1 | 10/2016 | Yu et al. | |
| 2016/0311348 A1 | 10/2016 | Watson et al. | |
| 2016/0343346 A1 | 11/2016 | Lee et al. | |
| 2016/0378422 A1 | 12/2016 | Kenjalkar | |
| 2017/0139661 A1 | 5/2017 | Veeramani et al. | |
| 2017/0182957 A1 * | 6/2017 | Watson | G08C 17/02 |
| 2017/0374114 A1 | 12/2017 | Feldman et al. | |
| 2018/0041559 A1 | 2/2018 | Chen | |
| 2018/0049250 A1 * | 2/2018 | Perng | H04L 67/34 |
| 2018/0197501 A1 | 7/2018 | Veeramani et al. | |
| 2018/0205983 A1 | 7/2018 | Lee et al. | |
| 2018/0293043 A1 | 10/2018 | Watson et al. | |
| 2018/0295191 A1 | 10/2018 | Warrick et al. | |
| 2019/0014373 A1 | 1/2019 | Shin et al. | |

* cited by examiner

SCREEN MIRRORING FROM PERSONAL ELECTRONIC DEVICES TO TRANSPORTATION VEHICLE DISPLAY SCREENS

CROSS-REFERENCE TO RELATED APPLICATIONS

This application is a continuation-in-part patent application of co-pending U.S. patent application Ser. No. 15/479,538 filed Apr. 5, 2017 and entitled "SCREEN MIRRORING FROM PERSONAL ELECTRONIC DEVICES TO TRANSPORTATION VEHICLE DISPLAY SCREENS," the disclosure of which is wholly incorporated herein by reference in its entirety and for all purposes.

STATEMENT RE: FEDERALLY SPONSORED RESEARCH

Not Applicable.

BACKGROUND

1. Technical Field

The present disclosure relates generally to entertainment systems for transportation vehicles, and more particularly to screen mirroring from personal electronic display devices to display screens of transportation vehicles.

2. Related Art

Air travel typically involves journeys over extended distances that at the very least take several hours to complete. Some of the longer non-stop international flights have scheduled durations of over sixteen hours with travel distances extending beyond ten thousand miles. Passengers on board the aircraft are confined within an enclosed space of a designated seat for the entire duration of the flight, with only a few limited opportunities to leave the seat for use of the lavatory and so forth. Thus, even on the shortest trips an airline passenger has some idle time, which the passenger may occupy with work, leisure, and/or rest.

Airlines therefore provide onboard in-flight entertainment and communications (IFEC) systems that offer a wide variety of multimedia content for passenger enjoyment. Recently released movies are a popular viewing choice, as are television shows such as news programs, situation and stand-up comedies, documentaries, and so on. Useful information about the destination such as airport disembarking procedures, immigration and custom procedures and the like are also frequently presented. Audio-only programming is also available, typically comprised of playlists of songs fitting into a common theme or genre. Likewise, video-only content such as flight progress mapping, flight status displays, and so forth are available. Many in-flight entertainment systems also include video games that may be played by the passenger.

The specific installation may vary depending on service class, though in general, each passenger seat is equipped with a display device, an audio output modality, an input modality, and a terminal unit. The terminal unit may generate video and audio signals, receive inputs from the input modality, and execute pre-programmed instructions in response thereto. The display device is typically an LCD screen that is installed on the seatback of the row in front of the passenger, though in some cases it may be mounted to a bulkhead or retractable arm, or the like, that is in turn mounted to the passenger's seat. Furthermore, the audio output modality is a headphone jack, to which a headphone, either supplied by the airline or by the passenger, may be connected.

The multimedia content is encoded and stored as digital data, with a video decoder and audio decoder of the terminal unit functioning to generate the aforementioned video and audio signals therefrom. It is desirable to have a wide range of different multimedia content to satisfy the varying tastes of passengers. It is also desirable to have a sufficient volume of multimedia content so that passengers can remain occupied with entertainment for the entire duration of the flight. This data may be stored on a central content server, with each terminal unit including networking modalities such as Ethernet to establish a data communications link to the central content server. Following retrieval, the multimedia content data is decoded and presented on the display device.

Notwithstanding the availability of airline-installed IFEC equipment such as the aforementioned seatback display screens and headphone jacks, an increasing number of passengers are choosing to bring on board their own portable electronic devices (PEDs) such as smart phones, media players, electronic readers, tablets, laptop computers, and so forth. In most cases, these devices are loaded with music, video, games, and other multimedia content of the user's choosing well before embarking. Although passengers are increasingly relying upon the PED itself to view video content (and thereby circumventing the aircraft-installed IFEC system entirely), the display area, particularly with smaller form factor devices such as smartphones and "phablet" type devices, tends to be smaller than the display devices of the newer IFEC system installations. Thus, in addition to sharing multimedia content from the IFEC system to the PEDs, there are use cases in which multimedia content stored on the PEDs are presented on the display devices of the IFEC system.

Fundamentally, PEDs function as mass storage devices that may be connected via a standard physical and logical interface such as Universal Serial Bus (USB). Popular, albeit proprietary physical interfaces such as the Apple® 30-pin connector, as well as standardized analog (composite) and digital (High Definition Multimedia Interface/HDMI) video connectors have also been provided on the passenger terminal unit. However, providing the correct cable for the myriad of possible passenger PEDs is problematic, and not all PEDs can be interconnected.

Although available data transfer bandwidth may be greater on wired solutions, wireless solutions based upon Wi-Fi and/or Bluetooth modalities have also been proposed. However, even to the extent universally compatible data transfer links between the passenger PED and the IFEC system can be provided, the terminal unit and/or of the IFEC system must have the appropriate media codec (coder/decoder) software in order to replay the external multimedia content. Although some level of standardization exists with video formats, each device or device platform (e.g., Apple iOS, Android, Windows, etc.) may utilize different formats. Due to the complex licensing issues with mobile video delivery, users may choose to encode video data using alternative, unrestricted formats. Thus, at any given time, different passenger PEDs may store multimedia content in accordance with a variety of formats, all of which must be accommodated by the IFEC system. Moreover, the video rendering technology, along with the codecs necessary to support the same, is ever-changing, and continually updating the IFEC system for new formats remains challenging.

In the transportation vehicle context, family members and friends travelling together may be seated in consecutive seats, and may desire to view multimedia programming together. The default assumption, however, is that any given passenger desires privacy and isolation from the adjacently seated passenger, and display devices typically include privacy screens that limit visibility for off-angle viewing.

Accordingly, there is a need in the art for improvements to the display of multimedia content stored on passenger PEDs to IFEC systems, particularly those that that are universal across various video codecs and file formats. There is also a need in the art for extending the display to other content, including games, text on e-readers, and the like, and also mirroring the multimedia content across multiple display devices.

BRIEF SUMMARY

The present disclosure is directed to wirelessly sharing display data streams such as playing multimedia content from a passenger portable electronic device (PED) to a seat back display, otherwise referred to herein as a display monitor. The system contemplates passengers being able to view media stored on their PED, rather than forcing the passenger to watch the media on the limited display screen of the PED. It is expressly envisioned that watching the multimedia content on the seat back display is more convenient than requiring the PED to be held for extended durations in potentially awkward positions. The multimedia content may also be shared with travel companions such as the case with passengers travelling with small children who has brought along a copy of the programs favored by such children. Thus, forwarding the screen case from one display monitor to another is contemplated.

One embodiment contemplates an entertainment system for a vehicle accommodating a passenger with a personal electronic device running or executing a screen sharing application. The entertainment system includes information processing devices, with each information processing device including a data processor, and at least one of the information processing devices comprising a display monitor. The entertainment system also includes a WLAN access point configured to establish a wireless data communications link with the personal electronic device. A screen sharing server executed by the data processor of one of the information processing devices is receptive to a display data stream generated on the portable electronic device based upon a redirected display output and transmitted to the screen sharing server over the wireless data communications link. In particular, the display data stream is transmitted following pairing of the screen sharing application with the information processing device comprising a display monitor, with the received display data stream rendered on that information processing device, i.e., the information processing device comprising a display monitor.

According to another embodiment, a display monitor system for sharing a display of a personal electronic device is contemplated. The display monitor system may include a data processor, a display device, and a wireless network interface controller for establishing a first wireless communications link with the personal electronic device. The display monitor system may include a pairing module that is executed by the data processor, and is in communication with a corresponding pairing module of the personal electronic device. A pairing may be established with the personal electronic device upon an exchange of a pairing request and a confirmation response. There may also be a display module that is in communication with a display transmitter of the personal electronic device based upon the established pairing. A display data stream that is generated by a display capture module thereof may be transmitted from the display transmitter to the display module over the first wireless communications link. The received display data stream may be rendered on the display device.

In yet another embodiment, a method for sharing a display from a personal electronic device to one or more display monitors installed in a vehicle is disclosed. The method may include transmitting a request from the personal electronic device to pair the personal electronic device with a first one of the one or more display monitors over a wireless communications link. Thereafter, there may be a step of validating the request to pair the personal electronic device with the first one of the one or more display monitors, and establishing a pairing relationship between the personal electronic device and the first one of the one or more display monitors in response to successful validation of the request. The method may also include capturing or producing a display data stream from the personal electronic device, as well as transmitting the captured display data stream over the wireless communications link from the personal electronic device to the first one of the one or more display monitors with which the personal electronic device is paired. Validation of the request may be on the display monitor or an IFEC server. Moreover, the transmitting of the display data stream may be first to the IFEC server and then to the display monitor.

In another aspect, the disclosure describes an entertainment system for a vehicle accommodating a passenger with a personal electronic device executing a screen sharing application. The entertainment system includes a network onboard the vehicle, and information processing devices. Each information processing device includes a data processor, and at least one of the information processing devices comprises a display monitor with each information processing device being connected to or in communication with the network.

A screen sharing server is executed by the data processor of one of the information processing devices. The screen sharing server is receptive to a display data stream communicated over the network to the screen sharing server by execution of the screen sharing application of the portable electronic device. The display data stream is transmitted after pairing of the screen sharing application with the at least one of the information processing devices comprising a display monitor.

A media player application is executed by the data processor of the one of the information processing devices. The media player application determines if the display data stream communicated over the network is encrypted. If the determination is that the display data stream is encrypted, the media player application requests a license. After receipt of the license, a decrypted display data stream is rendered on the at least one of the information processing devices comprising a display monitor. In a further aspect, if the display data stream is not encrypted, the display data stream is rendered without the media player application requesting a license.

In another aspect, the at least one of the information processing devices comprising a display monitor includes a cryptographic module executed by the data processor of the information processing device in communication with the media player application. The cryptographic module after receipt of the license by the media player application, decrypts the display data stream using at least one cryptographic key and provides a decrypted display data stream.

In yet another aspect, the display data stream is communicated to the network from the personal electronic device. In a further aspect thereof, the screen sharing server is receptive to an audio data stream generated on the portable electronic device based upon a redirected audio output and transmitted to the screen sharing server over the wireless data communications link. The display data stream and the audio data stream is combined into a single video data stream.

In yet another further aspect, the entertainment system includes a remote communications module connected to the network. The request for a license is communicated over a remote data link established by the remote communications module to the Internet. In a different further aspect, the entertainment system includes a remote communications module connected to the network as above. In this aspect however, the display data stream is communicated over a remote data link established by the remote communications module to the network onboard the vehicle from a content delivery network off board the vehicle.

In another aspect, the disclosure describes a display monitor system for sharing a display of a personal electronic device. The system includes a data processor, a display device, a wireless network interface controller for establishing a first wireless communications link with the personal electronic device and a pairing module executed by the data processor and in communication with a corresponding pairing module of the personal electronic device. A pairing is established with the personal electronic device upon an exchange of a pairing request and a confirmation response.

The display monitor system also includes a display module in communication with the personal electronic device based upon the established pairing in which a display data stream is communicated to the display module over the first wireless communications link in response to a request from the personal electronic device. The display module determines if the display data stream is encrypted, and if the display data stream is encrypted, the display module requests a license and after receipt of the license, a decrypted display data stream is rendered on the display device.

In a further aspect of the display monitor system, the pairing module is in communication with a pairing module of another display monitor system over a wired communications link. The display monitor systems are connected upon an exchange of a second pairing request and a second confirmation response. In a still further aspect of the display monitor system, wherein the display module is connected to a display module of the other display monitor system, in which the display data stream being communicated to the display module is relayed by the display module to the display module of the another display monitor system following a successful connection therewith.

In a different further aspect of the display monitor system, the confirmation response is generated from a user input to a query presented on the display device. In another different further aspect of the display monitor system, the pairing module is connectable to a central server with a passenger manifest in which the confirmation response is generated based upon a correlation of the pairing request to the passenger manifest.

In still a different further aspect of the display monitor system, where if the display data stream is not encrypted, the display data stream is rendered on the display device without the display module requesting a license. In another different further aspect, wherein the display module includes a cryptographic portion in which the cryptographic portion after receipt of the license decrypts the display data stream using at least one cryptographic key.

In another aspect, the disclosure describes a method for sharing a display from a personal electronic device to one or more display monitors installed in a vehicle. The method includes providing a network on the vehicle and connecting the display monitors in communication with the network. The method also includes communicating a request over the network from the personal electronic device to pair the personal electronic device with a first one of the one or more display monitors over a wireless communications link. In addition, the method includes validating the request to pair the personal electronic device with the first one of the one or more display monitors, and establishing a pairing relationship between the personal electronic device and the first one of the one or more display monitors in response to successful validation of the request. The method also includes using the personal electronic device to communicate a display data stream over the network to the first one of the one or more display monitors with which the personal electronic device is paired, if the display data stream is encrypted, requesting a license and after receipt of the license, decrypting the display data stream.

In a further aspect, wherein the network includes wired and wireless segments, the method includes transmitting a display link request from the first one of the one or more display monitors to a second one of the one or more display monitors over a wired section of the network. The method also includes validating the display link request with a linked relationship between the first one of the one or more display monitors and the second one of the one or more display monitor being established in response. The method additionally includes forwarding the display data stream from the first one of the one or more display monitors to the second one of the one or more display monitors with which the linked relationship is established.

In a different further aspect, wherein if the display data stream is received from the personal electronic device, the license is requested from the personal electronic device. In a further aspect thereof, the license comprises at least one cryptographic key.

In another different further aspect, the method includes providing a remote communications module connected to the network, wherein the request for a license is communicated over a remote data link via the remote communications module to a license server off board the vehicle. In a more detailed aspect thereof, the method includes providing a content decryption module for each display monitor executed by a data processor of the display monitor, wherein the content decryption module provides at least one cryptographic key after receipt of the license.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure is directed to display sharing between personal electronic devices (PEDs) and vehicle entertainment systems such as an in-flight entertainment for an aircraft or vehicle for transport of passengers. The detailed description set forth below in connection with the appended drawings is intended as a description of the presently preferred embodiments of the system, and is not intended to represent the only form in which it can be developed or utilized. The description sets forth the features of the system in connection with the illustrated embodiments. It is to be understood, however, that the same or equivalent functions may be accomplished by different embodiments that are also intended to be encompassed with the present disclosure. It is further understood that the use of relational terms such as first, second, and the like are used solely to distinguish one from another entity without necessarily requiring or implying any actual such order or relationship between such entities.

Figure 1:
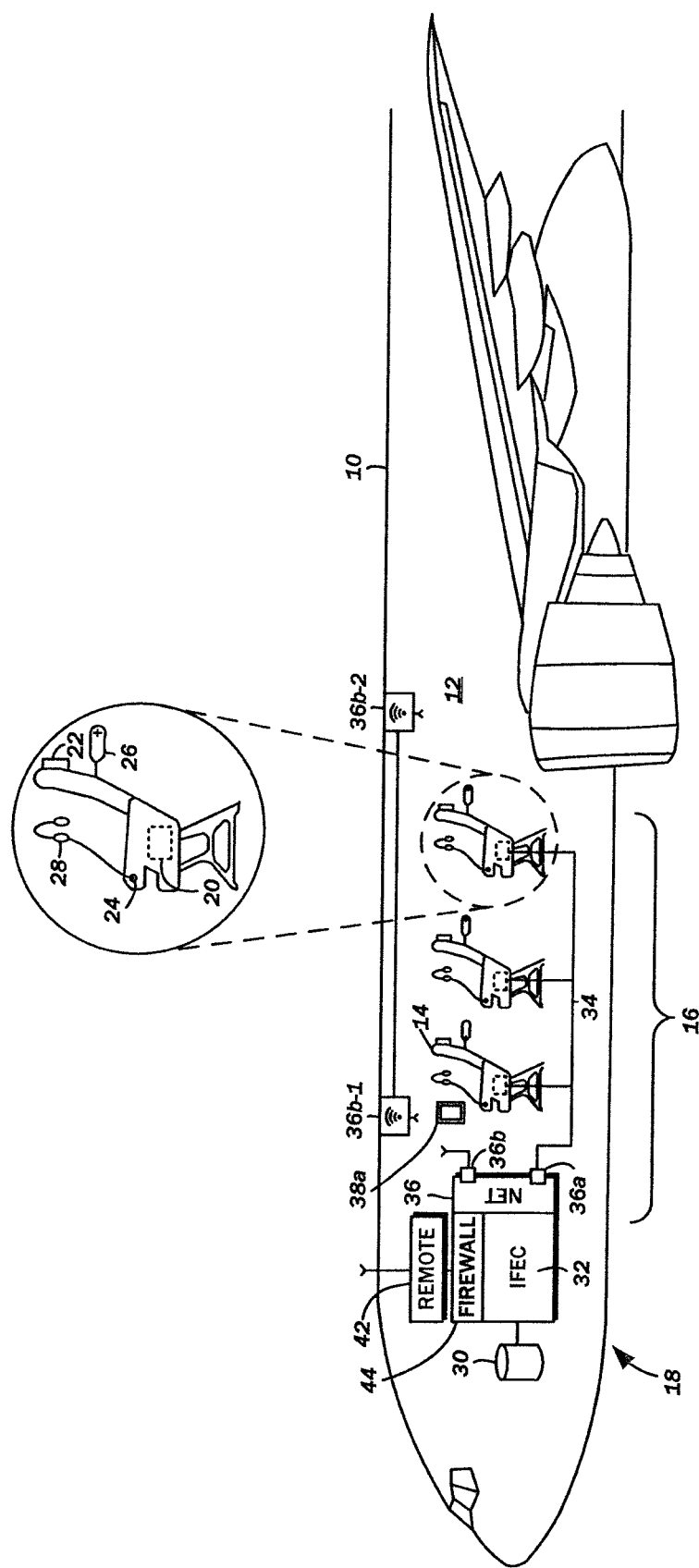
FIG. 1 is a diagram of an exemplary aircraft environment in which one aspect of the presently disclosed system for display sharing may be utilized.

The diagram of FIG. 1 depicts an exemplary aircraft 10 in which various embodiments of the presently disclosed display sharing system may be implemented. Within a fuselage 12 of the aircraft 10 there are seats 14 arranged over multiple rows 16, with each seat 14 accommodating a single passenger. Although the features of the present disclosure will be described in the context of the passenger aircraft 10 and amenities therefor, other passenger vehicles such as trains, watercraft, buses, and others utilizing integrated entertainment systems may be substituted. Furthermore, the term exemplary as used herein means serving as an illustrative, non-limiting example or instance. Although a best mode embodiment is contained herein, an embodiment or configuration described as "exemplary" is not necessarily to be construed as preferred or advantageous over other embodiments.

The aircraft 10 incorporates an in-flight entertainment and communications (IFEC) system 18, through which various entertainment and connectivity services may be provided to passengers while onboard. A typical IFEC system 18 includes individual seat modules comprised of a terminal unit 20, a display device 22, an audio output device 24, and a remote controller 26. For a given row 16 of seats 14, the terminal unit 20 and the audio output device 24 are disposed on the seat 14 for which it is provided, but the display device 22 and the remote controller 26 may be disposed on the row 16 in front of the seat 14 to which it is provided. That is, the display device 22 and the remote controller 26 are installed on the seatback of the row in front of the seat. This is by way of example only, and other display device 22 and remote controller 26 mounting and access configurations such as a retractable arm or the like mounted to an armrest of the seat 14 or by mounting on a bulkhead.

The display device 22 is understood to be a conventional liquid crystal display (LCD) screen with a low profile that is suitable for installation on the seatback. Each passenger can utilize an individual headset 28, supplied by either the airline or by the passenger, which provides a more private listening experience. In the illustrated embodiment, the audio output device 24 is a headphone jack that is a standard ring/tip/sleeve socket. The headphone jack may be disposed in proximity to the display device 22 or on the armrest of the seat 14 as shown. The headphone jack may be an active type with noise canceling and including three sockets or a standard audio output without noise canceling. In alternate embodiments, each display device 22 may incorporate a terminal unit 20 to form a display unit referred to in the art as a smart monitor. Such a smart monitor, as well as any combination of hardware and software components that work together to present content to individual passengers, may also be referred to herein as a display monitor 48.

A common use for the terminal unit 20 installed on the aircraft is the playback of various multimedia content. The terminal unit 20 may be implemented with a general-purpose data processor that decodes the data files corresponding to the multimedia content and generates video and audio signals for the display device 22 and the audio output device 24, respectively. This multimedia content may include movies, television shows, such as news programs, comedy, documentaries, and informational content pertinent to the flight destination. Furthermore, multimedia content may also encompass audio-only programming, as well as interactive games, flight progress mapping, flight status displays, newspapers/magazines readable on the display device 22, and so on. Broadly, multimedia content is intended to refer to any content of varying duration and form that can be presented to the passenger via the display device 22 or the audio output device 24, or a combination thereof.

The data files of the multimedia content may be stored in a database 30 associated with the IFEC system 18. Specifically, the database 30 is connected to and managed by an IFEC server 32, which may be a specifically adapted general purpose computer system configured as a server to provide data in response to requests therefor. Various software modules are understood to be incorporated into the IFEC server 32, including a streaming server that retrieves the multimedia content from the database 30, as well as a cataloging/menu application with which the user interacts to select the desired multimedia content.

The passenger can play games being executed on the terminal unit and otherwise interact with the multimedia content with the remote controller 26. Navigating through the vast multimedia content library and selecting ones for viewing and/or listening is also possible with the remote controller 26, though in some embodiments, a touch-screen display may be provided for a more intuitive interaction with the multimedia content library. In either case, the terminal unit 20 is loaded with a content selection software application that is executed by the data processor and accepts input from the remote controller 26 or other input modality and generates a response on the graphical interface presented on the display device 22.

Each of the terminal units 20 may be connected to the IFEC server 32 over an aircraft local area network 34, one segment of which may preferably be Ethernet. Thus, the IFEC server 32 includes a data communications module 36, and more specifically, an Ethernet data communications module 36a, e.g., an Ethernet switch or router.

One or more passengers may utilize a portable electronic device (PED) 38 during flight. For purposes of the present disclosure, passenger PEDs 38 refer to smart phones, tablet computers, laptop computers, and other like devices that include a general purpose data processor that executes pre-programmed instructions to generate various outputs on a display, with inputs controlling the execution of the instructions. Although these devices are most often brought on board the aircraft 10 by the passengers themselves, carriers may also offer them to the passengers for temporary use.

Almost all conventional PEDs 38 have a WLAN (Wi-Fi) module. In order to provide onboard connectivity, the data communications module 36 of the IFEC server 32 also includes a WLAN access point 36b. The PEDs 38, via the onboard WLAN network, may connect to the IFEC server 32 to access various services offered thereon such as content downloading/viewing, shopping, and so forth.

Typically, a single WLAN access point 36b is insufficient for providing wireless connectivity throughout the cabin, so additional WLAN access points 36b-1 and 36b-2 may be installed at various locations spaced apart from each other. These additional WLAN access points 36b-1 and 36b-2 may be connected to the IFEC server 32 over an Ethernet link that is part of the aforementioned aircraft local area network 34. The local area network interface or data communications module 36 is understood to encompass the hardware components such as the WLAN access point 36b/transceiver and the Ethernet router/switch 36a, as well as the software drivers that interface the hardware components to the other software modules of the IFEC server 32.

The IFEC system 18 may also offer Internet access to the connecting terminal units 20 as well as the PEDs 38 during flight. In this regard, the IFEC server 32 may include a remote communications module 42 that establishes a remote data uplink, which in turn is connected to the Internet. The remote data uplink may be to a satellite, utilizing Ku-band microwave transmissions. Alternative satellite communications systems such as Inmarsat or Iridium may also be utilized. In another embodiment, the remote communications module 42 may be a cellular modem. The terminal unit 20 or the PEDs 38 connect to the IFEC server 32 via the aircraft local area network 34 established by the data communications module 36, which relays the data transmissions to the remote communications module 42. Due to the high costs associated with the communications satellite or cellular networks in roaming mode, carriers may limit data traffic to and from the remote communications module 42 with a firewall 44.

The foregoing arrangement of the IFEC system 18, along with its constituent components, have been presented by way of example only and not of limitation. Those having ordinary skill in the art will recognize that the IFEC system 18 and its functional subparts can be arranged and organized in any number of different configurations. Furthermore, there may be additional components not mentioned herein, and certain functions may be handled by a different subpart or component than that to which the present disclosure attributes.

Figure 2:
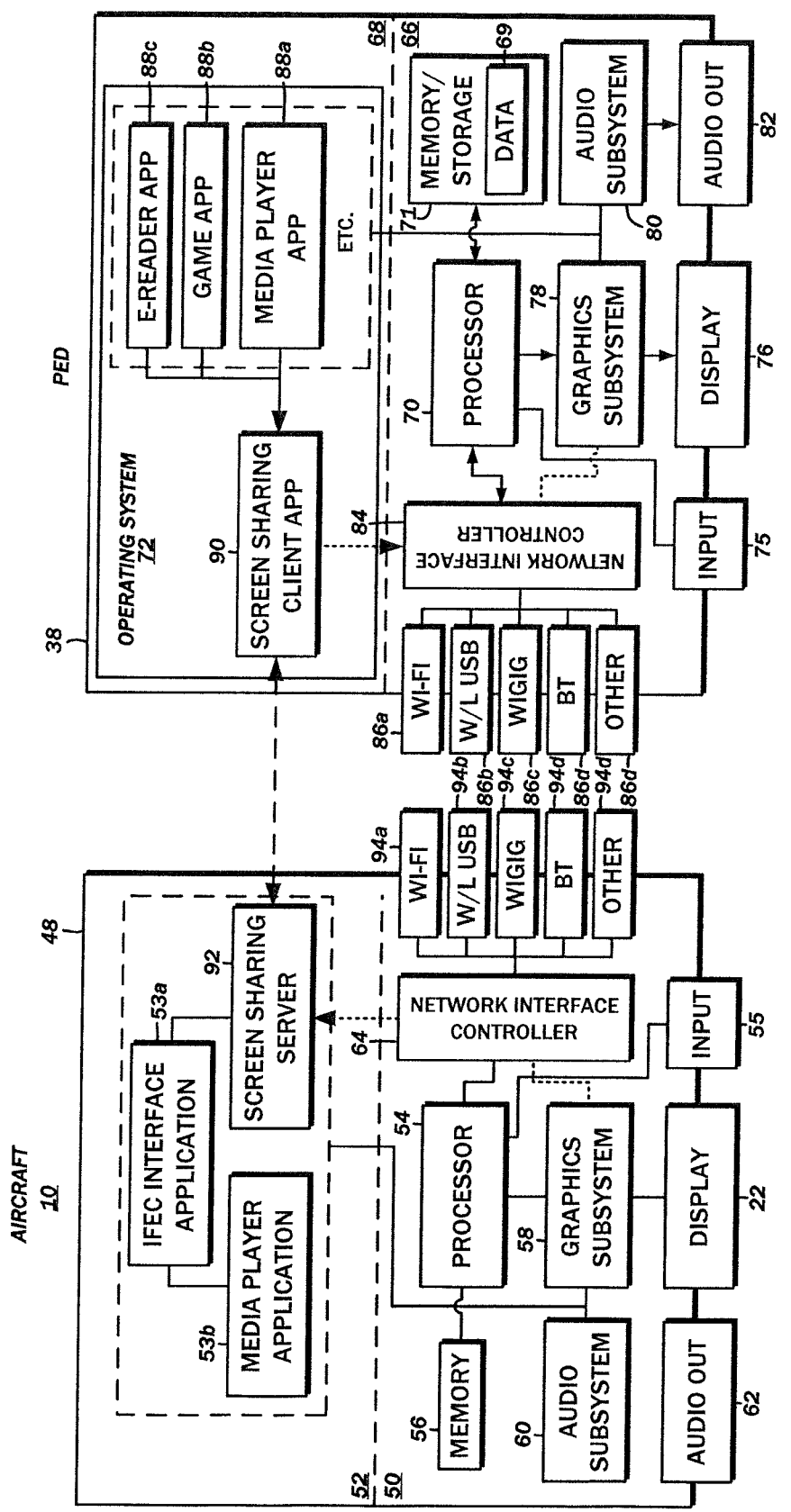
FIG. 2 is a block diagram showing the various components of a first embodiment of a system for display sharing.

Referring now to the block diagram of FIG. 2, various embodiments of the present disclosure contemplate a system 46 for sharing the display of a passenger PED 38 with one or more displays 22 of the IFEC system 18. As indicated above, the combined terminal unit 20 and the display device 22 may be referred to as a display monitor 48, which is also understood to be a part of the IFEC system 18. The display monitor 48 may be generally segregated into various hardware components 50 and software components 52, though this is by way of example only and not of limitation. The functionality of the display monitor 48 described herein may be achieved with components not specified explicitly, and different aspects may be performed by hardware, by software, and/or by a combination thereof.

The software components 52 may comprise a series of pre-programmed instructions that are executed by a central processor 54 (also referred to herein as a data processor) and stored in a memory 56. One of the software components 52 may be an IFEC interface application 53a that may provide a graphical user interface to navigate the various features of the IFEC system 18, such as the selection of multimedia content, and accepting playback commands, for example, starting, pausing, stopping, and fast forward/rewinding. A separate media player sub-application 53b invoked via the IFEC interface application 53a may handle such functionality, including the decoding and rendering of the multimedia content. In this regard, the media player sub-application 53b may implement various video codecs that are known in the art. In addition to the media player sub-application 53b, there may be separate sub-applications for games and other functions. Inputs to these applications are provided by the user via one or more input devices 55 such as touch screens, game controllers with a directional input pad, buttons, etc. Those having ordinary skill in the art will recognize the various ways in which such peripheral input devices may be connected to and interface with the display monitor 48, and so the details thereof have been omitted.

An exemplary embodiment of the display monitor 48 may further include a graphics subsystem 58 that further processes the output data from the central processor 54 to generate graphics on the display device 22. Additionally, the display monitor 48 may include an audio subsystem 60 that processes output data from the central processor 54 to generate sound via audio output devices 62, including the aforementioned headphone jack 24 to which the headphones may be connected. Although the example aircraft installation of FIG. 1 shows only the headphone jack 24, the audio output device 62 may include others such as speakers and the like.

The terminal unit 20, and hence the display monitor 48, also includes various data networking modalities, specifically a networking interface controller 64 that provides the physical layer interface and the data link layer interface between the central processor 54 and the network connection to a remote network node. In one context, the remote network node is the IFEC server 32, though in accordance with the various embodiments of the present disclosure, the remote network node may also be the passenger PED 38. That is, a data communications link may be established between a given seatback display monitor 48 for one passenger, and the PED 38 being used by such passenger. In one contemplated embodiment, as will be described in further detail below, the screen display of such PED 38 may be duplicated on the display monitor 48 over a data communications link established between the PED 38 and the display monitor 48.

The PED 38, as a general purpose computing device similar to the display monitor 48, is understood to have much of the same components. These may likewise be segregated into hardware components 66 and software components 68, though, again, the illustrated segregation of components and the functionality performed thereby are presented by way of example only. The functions are controlled by a central processor 70 that executes sequences of pre-programmed instructions corresponding to the software components 68. These instructions and other data 69 may be stored in a memory 71. Typical consumer PEDs 38 are built upon an operating system 72 that controls and provides an interface to the hardware components 66 from various software applications 74. Additionally, the operating system 72 may include a common graphical user interface generated on a display device 76 for invoking the functionality provided by such software applications 74. Inputs to manipulate the various graphical user interface elements may be provided via an input device 75, which is typically a touch panel. PEDs 38 are understood to include additional peripheral inputs such as a physical home button, volume buttons, and power buttons. The hardware components 66, together with the operating system 72 may be referred to as an operating platform, and examples of those currently available for PEDs 38 include the Apple iOS platform, the Google Android platform, and the Windows Mobile platform.

The output of the central processor 70 is displayed on the display device 76, and there may be an additional graphics subsystem 78 or video controller that processes the high-level graphics data into video signals that are passed to the display device 76 for output. A variety of video interfaces are known in the art, including Digital Visual Interface (DVI), High Definition Multimedia Interface (HDMI), DisplayPort, Video Graphics Array (VGA), and others.

Audio output may also be generated by the PED 38, and to this end, there is understood to be an audio subsystem 80 that processes the digital audio data to analog audio signals, which are passed to an audio output device 82. The audio output device 82 may include loudspeakers, as well as audio jacks to which personal headphones and the like may be connected. Conventional PEDs 38 may also have Bluetooth audio features, in which case the digital audio data is not processed to an analog signal by the audio subsystem, but instead passed to a Bluetooth transmitter.

Along these lines, the PED 38 is commonly used in applications requiring data connectivity such as e-mail and messaging, Internet browsing, video streaming, and the like. Thus, the PED 38 includes a network interface controller 84 that establishes the physical layer and data link layer connections to a counterpart remote network node. As the PED 38 is used untethered most often, the networking modalities implemented therein are likewise wireless, such as Wi-Fi and Bluetooth. To this end, there may be additional data networking submodules. In the exemplary embodiment illustrated in FIG. 2, there may be a Wi-Fi submodule 86*a*, a WiGig submodule 86*b*, a Wireless USB submodule 86*c*, and a Bluetooth submodule 86*d*. These submodules are presented by way of example only, and not all such submodules may be included in every PED 38. There may also be additional other wireless or wired networking submodules 86*e*.

Additional functionality beyond that which is provided in the operating platform of the PED 38 is available via various apps. For example, a media player app 88*a*, a gaming app 88*b*, and an e-reader app 88*c*, though other apps that generate graphic and/or audio outputs are also possible. The graphic and audio outputs from each of these apps 88 are generated by the central processor 70 and provided to the graphics subsystem 78 and the audio subsystem 80, respectively. In accordance with various embodiments of the present disclosure, video/display data as would otherwise be output to the display device 76, and audio data as would otherwise be output to the audio output device 82, are transmitted to the display monitor 48 for output on its respective display device 22, and audio output device 62. The output from the apps 74 may be passed to a screen sharing client app 90, which communicates with a counterpart screen sharing server 92 running on the display monitor 48 to transmit a display data stream and an audio data stream thereto.

In one embodiment, the display data stream (and the audio data stream, to the extent applicable) may be digital data corresponding to one of the standard video interfaces, and the transmission thereof may be in accordance with a "screen casting" modality known in the art. Several such modalities rely upon Wi-Fi, and so the display monitor 48 is understood to incorporate a Wi-Fi submodule 94*a*. One screen casting modality is the Google Cast protocol (employed by Chromecast digital media players), which is available for use with the Android operating platform, and another is Apple AirPlay. Both of these modalities operate based upon the assumption that the originating device is on the same Wi-Fi network as the receiving display, and so the user of the PED 38 may be instructed to join the existing onboard wireless network, or in the alternative, to join a separate peer-to-peer network established only by the particular display monitor 48.

Another screen casting modality is Miracast, which is available on the Windows Mobile operating platform. Miracast utilizes the peer-to-peer Wi-Fi Direct standard, and contemplates wireless video transmissions up to 1080p (High Definition) utilizing the H.264 codec and 5.1 surround sound. Advance Audio Coding (AAC) and AC-3 are understood to be optional codecs, while the mandated codec employs linear pulse-code modulation and audio data being represented with 16 bits at a 48 kHz sampling rate in two channels. The peer-to-peer wireless connection is established with Wi-Fi Protected Setup (WPS) and secured with Wi-Fi Protected Access 2 (WPA2). The internet layer communications rely upon the IPv4 protocol, and transport layer communications utilize either TCP (transportation control protocol) or UDP (user datagram protocol). Furthermore, at the application layer, the data stream is initiated and controlled with RTSP (Real Time Streaming Protocol), and RTP (Real Time Transport Protocol) for data transfers.

Alternatively, Wireless USB may be utilized for transferring video and audio stream data from the PED 38 to the display monitor 48, and so the display monitor 48 may include a Wireless USB submodule 94*b*. As understood, Wireless USB is based upon the now defunct WiMedia Alliance Ultra Wideband (UWB) common radio platform capable of transmitting data at 480 Mbit/s over distances up to 9.8 ft or 3 meters, and at 110 Mbit/s over distances up to 33 ft or 10 meters. The operating frequency of Wireless USB is in the 3.1 GHz to 10.6 GHz range, but availability may depend on local regulatory policies and which frequency bands are open for unrestricted use.

Still another wireless display sharing modality is based upon WiGig in the unlicensed 60 GHz operating frequency range and the Wireless DisplayPort standard. Thus, the display monitor 48 may include a WiGig submodule 94*c* that communicates with the corresponding WiGig submodule 86*b* of the PED 38. The WiGig specification permits data transmission at multi-gigabit speeds and thus enables high performance wireless data, display, and audio applications. Tri-band enabled devices that operate at the 2.4 GHz, 5 GHz, and 60 GHz bands are contemplated to deliver data transfer rates up to 7 Gbit/s, which is equivalent in speed to an eight-band 802.11ac transmission and more than eleven times faster than the highest 802.11n rate, while maintaining compatibility with existing Wi-Fi devices. Further, WirelessHD, also referred to as UltraGig, which is based upon a 7 GHz channel in the 60 GHz operating frequency band, may also be utilized.

Bluetooth Alternate MAC/PHY, which refers to the transport link utilized in Bluetooth High Speed, may also be utilized to establish the initial communications link between the PED 38 and the display monitor 48, followed by wide bandwidth transmissions over the various Wi-Fi-based wireless networking modalities discussed above. In this regard, the display monitor 48 may include a Bluetooth submodule 94*d*.

Although various exemplary screen casting modalities are referenced herein, these are presented by way of example only and not of limitation. Any other suitable modality may be readily substituted without departing from the scope of the present disclosure.

Figure 3:
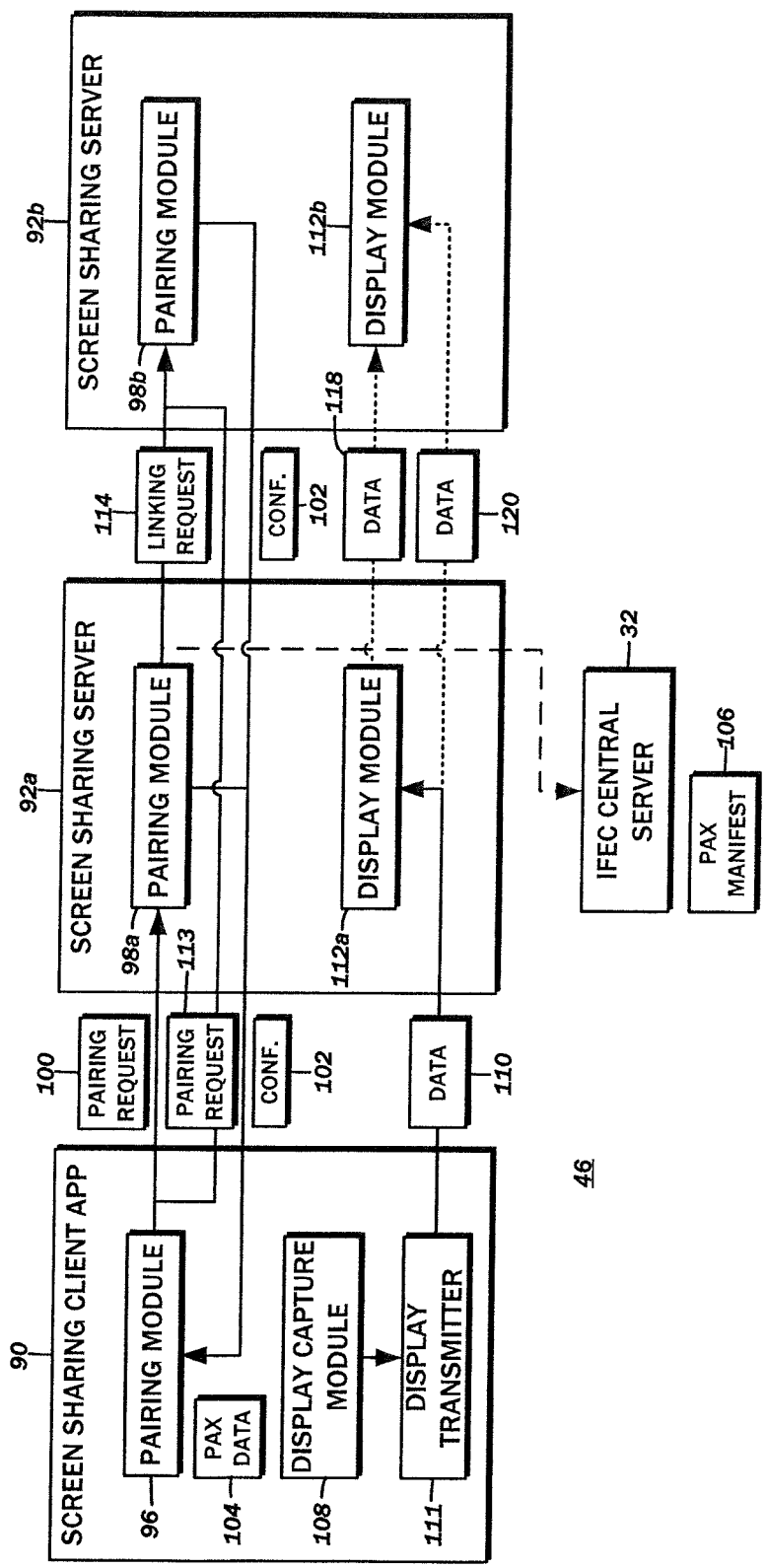
FIG. 3 is a detailed block diagram of the system for display sharing.

Referring to the block diagram of FIG. 3, the system 46 for display sharing will now be considered in terms of the functional inter-relationships between the screen sharing client app 90 and one or more screen sharing servers 92. In this exemplary illustration a first screen sharing server 92*a* is understood to be running on a first one of multiple display monitors 48 installed within the aircraft. There is also a second screen sharing server 92*b* that is running on a second one of the multiple display monitors 48. By way of example, the first one of the display monitors 48 is associated with a first passenger seat 14, while the second one of the display monitors 48 is associated with an adjacent second passenger seat 14 in the same row 16. This example is not intended to be limiting, however, as the system 46 can be extended to other display monitors 48 installed within the aircraft 10.

The screen sharing client app 90 running on the PED 38 may include a pairing module 96 that communicates with a corresponding pairing module 98*a* of the first screen sharing server 92*a*. In one implementation, a paired relationship is established between the pairing module 96 and the pairing module 98*a* following a transmission of a pairing request 100 originating from the PED 38, that is, the pairing module 96, and a confirmation 102 that is returned by the display monitor 48, that is, the pairing module 98*a*. One example pairing procedure is described in applicant's co-pending application published as U.S. Pat. App. Pub. No. 2016/0311348 entitled PASSENGER SEAT PAIRING SYSTEM, the entirety of the disclosure of which is hereby incorporated by reference.

It is possible to conduct the pairing process manually, in which the user of the PED 38 initiates the pairing request 100 by invoking this functionality from the screen sharing client app 90. Upon receipt of the pairing request 100 on the first screen sharing server 92*a*, the user may be prompted to confirm the pairing request. Based upon a user input that affirms the pairing request, the pairing module 98*a* may transmit the confirmation 102 back to the pairing module 96 of the screen sharing client app 90.

The pairing process can be conducted automatically as well. Stored on the PED 38, and specifically in a memory space accessible by the screen sharing client app 90 may be passenger data 104 that associates the user of the PED with a particular seat assignment. This information may be transmitted as part of the pairing request 100, and upon receipt, the pairing module 98*a* may query the IFEC server 32 that maintains a passenger manifest 106. After validating the received passenger data 104 against the passenger manifest 106, the confirmation 102 may be transmitted from the pairing module 98*a* to the pairing module 96.

Whether paired manually or automatically, an identifier associated with the first screen sharing server 92*a* or the display monitor 48 on which it is running, is recorded. Transmissions of the display data stream from the PED 38 are then directed to those display monitors 48 thus identified.

The screen sharing client app 90 includes a display capture module 108 that processes the video and audio data from the graphics subsystem 78 and the audio subsystem 80 of the PED 38, and generates a display data stream 110 that is transmitted to a corresponding display module 112*a* of the first screen sharing server 92*a* by a display transmitter 111. Although reference is made only to the display data stream 110, it is understood to encompass audio data in addition to the display data. The display may be mirrored as between the PED 38 and the display monitor 48, that is, both the PED 38 and the display monitor show the same content. Optionally, the display device 76 of the PED 38 may be disabled so that only the display monitor 48 is in use. Accordingly, it is no longer necessary for the user to hold the PED 38 at the necessary viewing angle, and the content otherwise displayed on the PED 38 is now visible via the display device 22.

In accordance with another aspect of the present disclosure, display sharing with another display monitor 48 that is running a second instance of the second screen sharing server 92*b* is contemplated. That is, the display of the PED 38 is replicated on two or more additional display monitors 48. This feature may be advantageous where several adjacent passengers such as travelling family members may desire to watch the same multimedia content together. The linking of the second screen sharing server 92*b* may be achieved by the transmission of a display link request 114 from the first screen sharing server 92*a*. The display link request 114 may be generated in response to user input on the first display monitor 38, though it is possible to originate from the pairing module 96/PED 38. The request may specify the seat with which the second screen sharing server 92*b* is associated. For example, the user interface of the first display monitor 48 may accept selections of seats, e.g., "21B, 21C" to which the request is to be sent.

A similar request-confirmation procedure may take place, in which the user is prompted to confirm the linking from the second display monitor 48. For example, this second user may be prompted "21A would like to share movies with you. Do you accept?" Upon answering in the affirmative via the user interface of the second display monitor 48, a confirmation 116 is transmitted back to the pairing module 98*a*, at which point the second pairing/linking relationship is established. A relationship established between the PED 38 and the display monitor 48 may be referred to as the devices being paired, which may be distinguished from a relationship established between multiple display monitors 48 as being linked. Because both display monitors 48 are part of the wired aircraft local area network 34, data transmissions between them may take place thereon. In this configuration, the display data stream 110 received by the display module 112*a* is relayed to the display module 112*b* of the second screen sharing server 92*b* in a forwarded display data stream 118.

The pairing request 113 may be initiated from the pairing module 96 of the PED 38, with the confirmation 116 being transmitted back to the pairing module 96. The display data stream 120 may be relayed from the display module 112*a*, or alternatively, broadcast 120 from the display transmitter 111 of the screen sharing client app 90.

After the respective display modules 112 receive the display data streams 110, 118, or 120, the video/audio data is decoded and output to the display device 22 and the audio output devices 62.

The present disclosure also contemplates various methods for sharing a display of the PED 38 to one or more display monitors 48. With reference to the flowchart of FIG. 4A, the method may begin with a step 200 of transmitting the pairing request, as mentioned above, from the PED 38 and the pairing module 96 thereof, to the display monitor 48. Again, this transmission is understood to take place over a wireless communications link. Thereafter, in a step 210, the pairing request is validated from the display monitor 48. Once validated, a pairing relationship between the PED 38 and the display monitor 48 is established. With the pairing relationship established, the method continues with a step 220 of using the PED 38 to capture or produce a display data stream from the PED 38 with the aforementioned display capture module 108. The display transmitter 111 then transmits this display data stream to the display monitor 48 in a step 230.

Figure 4A:
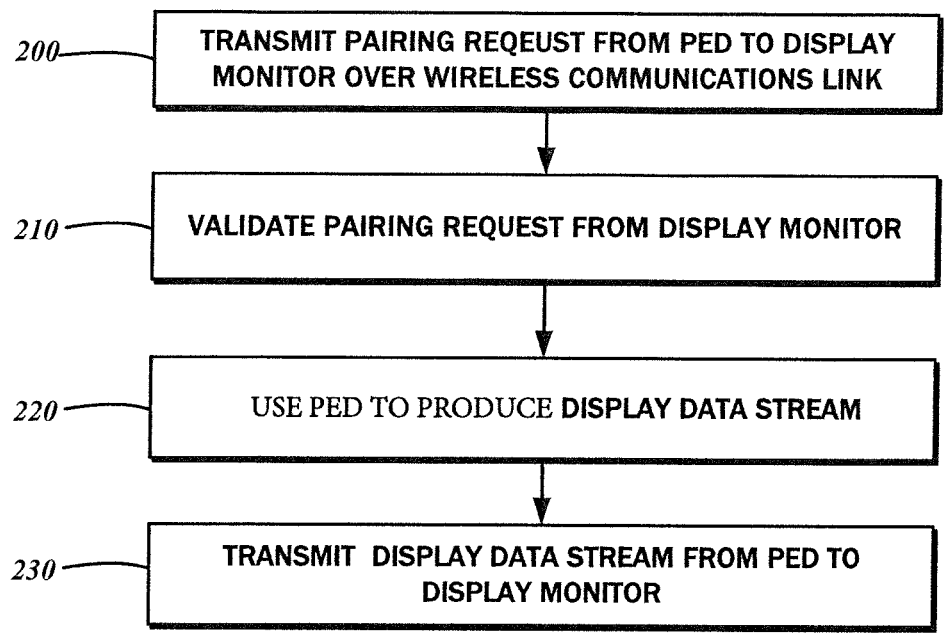
FIG. 4A is a flowchart depicting a first embodiment of a method for sharing a display from a personal electronic device to a display monitor installed in a vehicle.
Figure 4B:
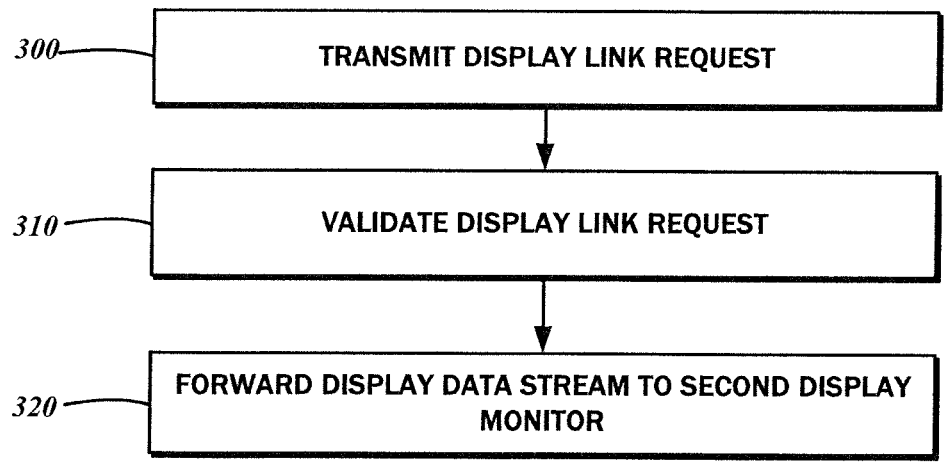
FIG. 4B is a flowchart depicting a second embodiment of the method for sharing the display.

The flowchart of FIG. 4B illustrates an additional embodiment of the method in which a second display monitor 48 is linked. The method continues with a step 300 of transmitting the display link request 114 from the pairing module 98a of the first screen sharing server 92a to the pairing module 98b of the second instance of the second screen sharing server 92b. This transmission is understood to take place over a wired communications link. Thereafter, the display link request 114 is validated in a step 310. Upon validation, a linked relationship between the two display monitors 48 is established, and in a step 320, the display data stream 118, 120 is forwarded to the second display monitor 48.

Returning to FIGS. 1 and 3, the wireless link from PED 38 to screen sharing server 92 may alternatively be via a WLAN access point 36b-1 or 36-b2 to the IFEC server 32, which thereafter communicates the display data to the recipient display monitor or monitors 48. In FIG. 4A, block 230 therefore also includes transmitting a display data stream 110 from a PED 38 indirectly to a display monitor 48 via a WLAN access point 36b-1 or 36b-2. The communication path of the data stream 110 from the PED 38 in this situation is via a WLAN access point 36-b1 or 36-b2 to the IFEC server 32, and via a wired connection from the IFEC server 32 to the recipient display monitor 48 (could also be a wireless communication from the IFEC server to the display monitor in alternate configurations). Before a display monitor 48 will show display data 110 from a PED 38, the display monitor software may require entry of an access code. More particularly, the PED 38 from which the display data 110 originates may be presented with the option of entering an access code that the recipient of the display data on a display monitor 48 must enter before the data is displayed by the display monitor 38. This helps to ensure that only intended recipients receive and view the display data 110 from the PED 38.

Figure 5:
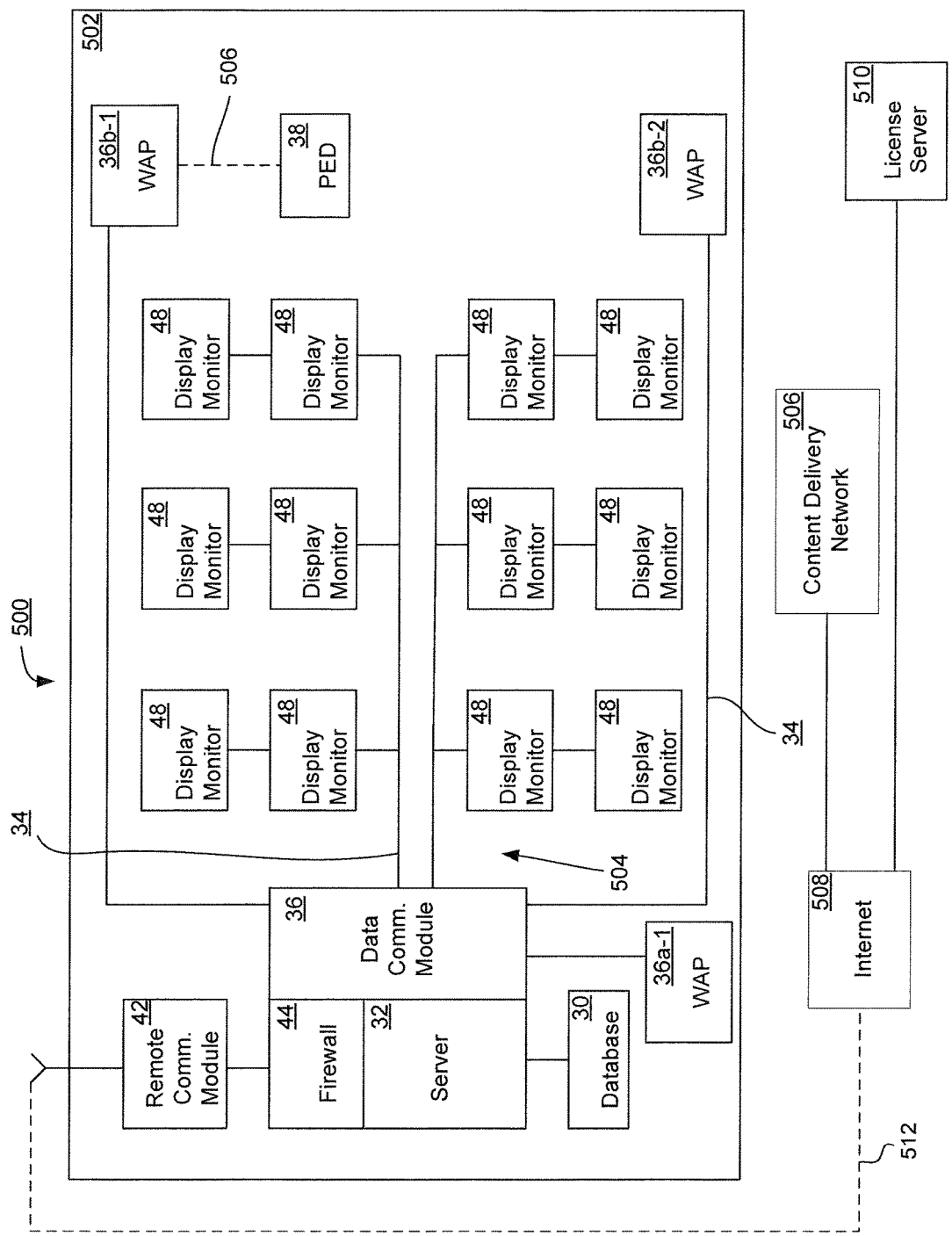
FIG. 5 schematically illustrates an entertainment system for a vehicle for accommodating passengers.

In another aspect, FIG. 5 schematically illustrates an entertainment system 500 for a vehicle 502 for accommodating passengers. By way of illustrative, non-limiting example, the vehicle 502 may be an aircraft, but is not limited thereto, and may be other types of vehicles for commercial transport of passengers, such as trains, ships, busses, or other types. Like numerals are used for previously described components of the entertainment system 500. In this regard, each passenger may bring aboard one or more PEDs 38 for use on the vehicle 500 or vehicle crew may provide passengers with a PED 38 for use while aboard the vehicle.

The entertainment system 500 includes a network 504 onboard the vehicle 502. The network 504 includes a wired segment 34 as previously described, and a wireless segment 506 in the vehicle 502 provided via WLAN access points 36b-1 or 36b-2, also as previously described. Passengers may use their PEDs 38 to connect to the entertainment system 500 via the wireless segment 506 of the network 504.

The vehicle 502 includes information processing devices in which each processing device includes a data or central processor. Information processing devices mount at seats of the vehicle 502 and comprise display monitors 48 for providing entertainment for passengers. Each display monitor 48 is connected in communication with the network 504, preferably to the wired segment 34 of the network 504. In some applications however, the display monitor may be connected to the wireless segment 506, or as another alternative, to both the wired and wireless segments 34 and 506 for providing redundancy.

Returning to FIG. 2, each display monitor 48 includes a data processor 54 executing a screen sharing server 92. The screen sharing server 92 is receptive to a display data stream 110 communicated over the network 504 to the screen sharing server by execution of the screen sharing application 90 of the PED 38. Communication or transmission of the display data stream 110 may only be performed after pairing of the screen sharing application 90 with the display monitor 48.

Figure 6:
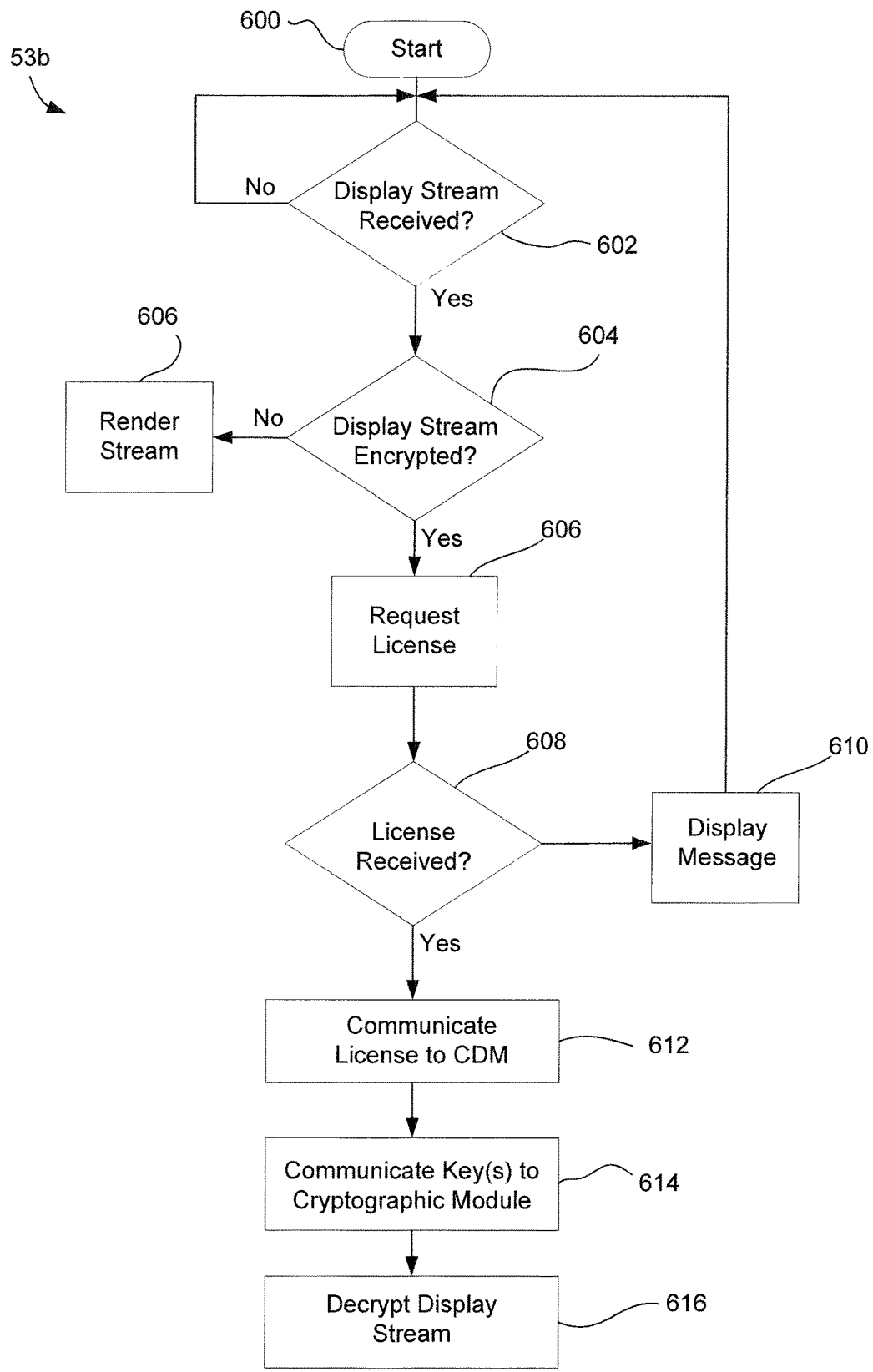
FIG. 6 schematically illustrates additional details of logic included with a media player application.

The data processor 54 of the display monitor 48 also executes a media player sub-application 53b (for more convenient reference, the media player sub-application is referred to hereinafter as simply "media player application"). FIG. 6 schematically illustrates additional details of logic included with the media player application 53b. After the media player application 53b is launched or started in block 600, the media player application 53b monitors for receipt of a display data stream 110 in block 602. If no display data stream 110 is detected, the media player application 53b continues to monitor for receipt of a display data stream. If receipt of a display data stream 110 is detected, the media player application 53b proceeds to block 604 and determines if the data display is encrypted.

Many content providers have implemented digital rights management (DRM) to prevent unauthorized consumption of content. DRM frequently involves encrypting a display data stream comprising the content to protect the content from consumption by an unauthorized user. A DRM solution becoming widely adopted is provided under the trademark WIDEVINE by Widevine Technologies (a Google company) of Kirkland, Wash., USA. The media player application 53b determines if the display data stream 110 being communicated thereto is encrypted in block 604, such as pursuant to WIDEVINE DRM or other type of DRM.

In FIG. 5, a passenger may use the screen sharing application 90 of the PED 38 to start communication of a display data stream 110 over the network 504 to a display monitor 48. However, the display data stream 110 may not be from the PED 38. Instead, the display data stream may be from a content delivery network 506 off board the vehicle 502. An example of a content delivery network is the network maintained under the trademark NETFLIX by Netflix, Inc. of Las Gatos, Calif., USA. Another popular content delivery network is a network maintained under the trademark AMAZON PRIME VIDEO by Amazon.com, Inc. of Seattle, Wash., USA. Both entities provide streaming video on demand, i.e., a display data stream, under their respective trademarks. There are other content delivery networks 506 as well, such as content delivery networks respectively maintained under the trademark HULU by Hulu LLC of Los Angles, Calif., USA; ITUNES by Apple Inc. of Cupertino, Calif., USA; and YOUTUBE by YouTube, LLC of San Bruno, Calif., among other content delivery networks.

A passenger on the vehicle 502 in FIG. 5, may use a PED 38 to communicate a display data stream 110 to a display monitor 48, in which the display data stream 110 is from the PED 38 as previously described, or from a content delivery network 506. The passenger may initially be receiving a display data stream 110 on the PED 38 via a WLAN access point 36b-1 or 36b-2 from a content delivery network 506 off board the vehicle over the Internet 508. More particularly, the entertainment system 500 includes a remote communications module 42 connected to the network 504. The display data stream 110 is communicated over a remote data link 512 established by the remote communications module 42 via the Internet 508 to a content delivery network 506. The remote data link 512 is established by conventional techniques known in the art, such as via satellite to a teleport on the ground, or to ground towers, or a combination thereof. Cellular communications may be employed as well.

The passenger may choose after pairing the PED 38 with a display monitor 48, to cast a display data stream 110 being received from a content delivery network 506 to the paired display monitor 48. In that case, the display data stream 110 is communicated to the paired display monitor 48 from the content delivery network 506. Alternatively, as previously described, data may been stored on the PED 38, and in this case, the display data stream 110 is communicated from the PED 38 to the display monitor 48 and rendered thereon.

If the determination in block 604 that the display data stream 110 is encrypted, the logic proceeds to block 606 and requests a license to decrypt the display data stream. Thereafter, the logic proceeds to block 608 and determines if the requested license has been received. If the determination in block 608 is no, i.e., that the license has not been received within a predefined amount of time, a predetermined number of requests, or some combination thereof, the logic displays a message that the display data stream 110 cannot be rendered in block 610. From block 610, the logic returns to monitor for receipt of a display data stream 110 in block 602. If the determination in that the display data stream 110 is encrypted in block 604, the display data stream 110 is rendered without the media player application 53 requesting a license.

Figure 7:
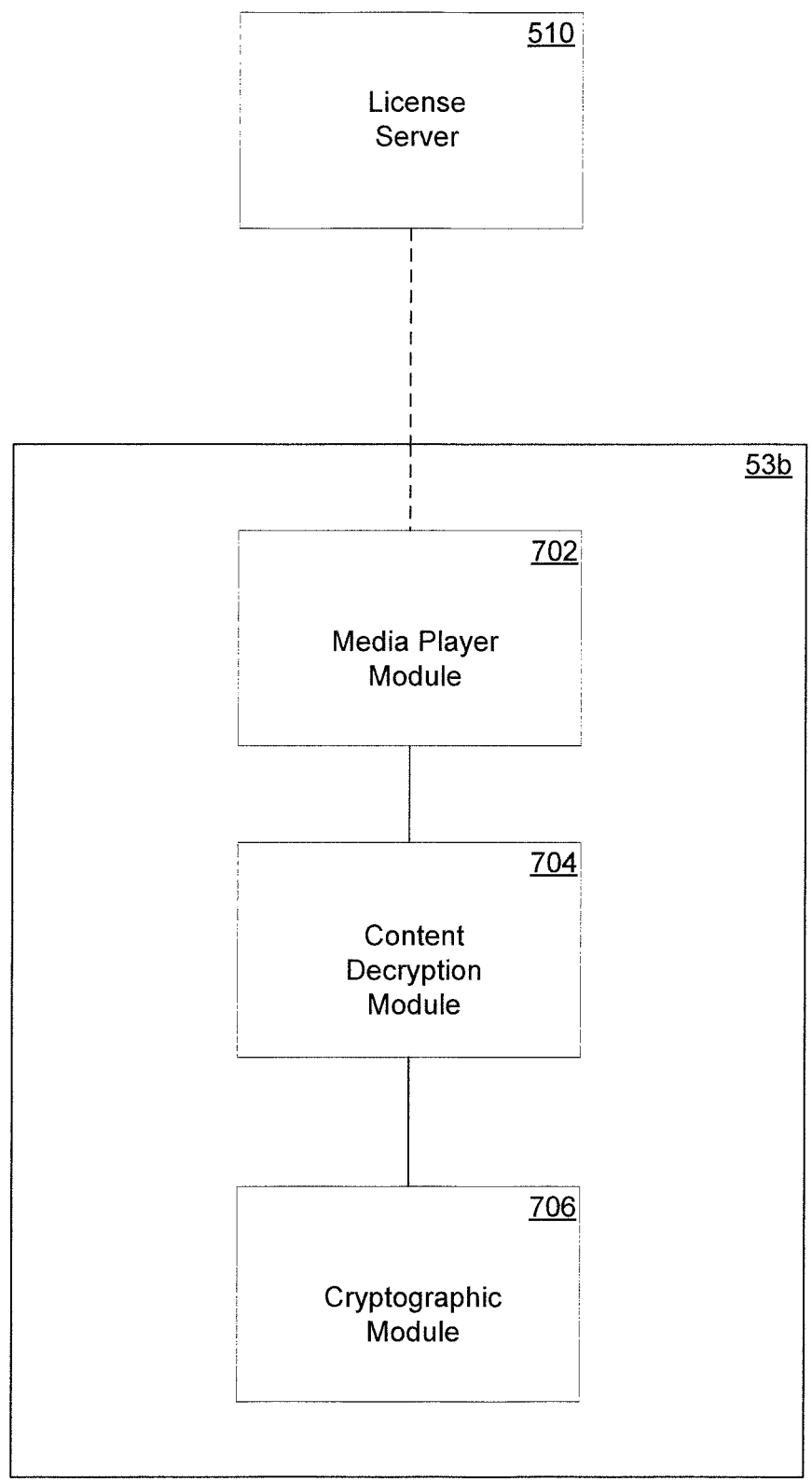
FIG. 7 schematically illustrates modules of the media player application.

The media player application 53b includes three modules 702, 704, and 706 as schematically illustrated in FIG. 7. After receipt of an encrypted display data stream 110, a media player module 702 passes data therefrom to a content decryption module 704. The content decryption module 704 prepares a license request based on the received data and communicates the license request to the media player module 702. The media player module 702 communicates the license request to a license server 708 external to the display monitor 708. If the source of the encrypted display data stream 110 is an off board content delivery network 506 (see FIG. 5), the license request is communicated to an off board license server 510. If the source of the encrypted display data stream 110 is a PED 38, the request may be communicated to the PED 38 to supply the license. The PED 38 may have the license stored with the data thereon, or the PED may be required to submit a request to a license server 510.

After the media player module 702 receives the license, the media player module 702 communicates the license to a content decryption module 704. The content decryption module 704 after receiving the license, communicates one or more encryption keys to a cryptographic module 706 (may also be referred to as an original equipment manufacturer cryptographic module or OEMCrypto module). The cryptographic module 706 after receiving the encryption key or keys, decrypts the encrypted display data stream and provides a decrypted display data stream.

Returning to FIG. 6, if the determination in block 608 is that a license has been received, the logic proceeds by communicating the license to the content decryption module 704 in block 612. Thereafter the content decryption module 704 communicates an encryption key or keys to the cryptographic module 706 in block 614. The process concludes in block 616 with decrypting the display data stream 110 in which the cryptographic module 706 uses at least one encryption key to decrypt the display data stream and provides an unencrypted display data stream, which is rendered on the display monitor 48. The decryption in block 616 continues as long as that data display stream is communicated to the media player application 53. FIG. 2 shows the display monitor 48 with a single data processor 54. Alternative implementations may be employed with multiple data processors 54, with decryption processing performed on different processors for enhancing performance.

Each display monitor 48 includes software implementing the Discovery and Launch specification provided under the trademark DIAL by Netflix, Inc. of Las Gatos, Calif., USA. The DIAL specification permits discovery and launching of an application on the display monitor 48 by a PED 38. With DIAL, a PED 38 may be using an application from a content delivery network 506 to receive and render a display data stream 110. When the user chooses to cast the display data stream 110 to the display monitor 48, the application on the PED is able to discover and launch via DIAL the media player application 53. Therefore, with DIAL, it is not necessary for the user to manually launch the media player application on the display monitor 48.

While WIDEVINE DRM has been described, other kinds of known DRM may be employed as well. For example, High-bandwidth Digital Content Protection (HDCP), is a type of DRM provided under license by Digital Content Protection LLC of Beaverton, Oreg., USA. With HDCP DRM, before sending data, a transmitting device determines whether the receiving device is authorized to receive the data. If so, the data is encrypted and streamed to the receiving device. Encryption and decryption requires an exchange of key information between the devices. Other or later-developed types DRM may be implemented as well.

The licenser server 510 has been described as off board the vehicle 502. In an alternative configuration with a vehicle lacking a remote communication module 42, a license server 510 may be provided aboard the vehicle 502. A license server 510 may also be provided aboard a vehicle 502 having a remote communication module 42, to conserve bandwidth and/or in case of communication interruptions preventing remote communication with an off board server.

The foregoing description has described a display data stream 110. However, sharing may be performed of non-streaming data as well, such as that used in the display of documents and publications. In this regard, the particulars shown herein are by way of example and for purposes of illustrative discussion of the various embodiments of the display sharing system only and are presented in the cause of providing of what is believed to be the most useful and readily understood description of the principles and conceptual aspects thereof. In this regard, no attempt is made to show more details than are necessary for a fundamental understanding of the disclosure, the description taken with the drawings making apparent to those skilled in the art how the several forms of the presently disclosed illumination module may be embodied in practice.

The invention claimed is:

1. An entertainment system for a vehicle accommodating a passenger with a personal electronic device executing a screen sharing application, the entertainment system comprising:
   a network onboard the vehicle;
   information processing devices located in the vehicle,
      wherein each information processing device is associated with a seat, includes a data processor, and is connected to the network,
      wherein the information processing devices comprises a first information processing device that comprises a first display monitor and a second information processing device that comprises a second display monitor,
      wherein the first information processing device is located in a first seat adjacent to and on a same row as that of a second seat that includes the second information processing device,
      wherein each of the first information processing device and the second information processing device includes a screen sharing server,
      wherein the screen sharing server of each of the first information processing device and the second information processing device is receptive to a display data stream communicated over the network from the personal electronic device upon execution of the screen sharing application of the personal electronic device,
      wherein the display data stream is communicated to the first information processing device after the screen sharing application is paired with the screen sharing server of the first information processing device,
   wherein the display data stream is communicated to the second information processing device after the first display monitor of the first information processing device is linked with the second display monitor of the second information processing device that is configured to:
      receive a display link request to link the second information processing device with the first information processing device, wherein the display link request specifies that the second seat is associated with the second information processing device;
      display, on the second display monitor and after the display link request is received, a prompt that requests a confirmation of whether the second display monitor is to be linked to the first display monitor;
      receive, via a user interface of the second display monitor, an affirmative confirmation that indicates an acceptance of a linking between the second display monitor and the first display monitor; and
      send, to the first information processing device, the affirmative confirmation to link the second display monitor with the first display monitor; and
   a media player application executed by the data processor of each of the first information processing device and the second information processing device, the media player application is configured to:
      render the display data stream on the first display monitor of the first information processing device and the second display monitor of the second information processing device.

2. The entertainment system of claim 1, wherein the screen sharing server of each of the first information processing device and the second information processing device is receptive to an audio data stream generated on the personal electronic device based upon a redirected audio output and transmitted to each screen sharing server over a wireless data communications link, wherein the display data stream and the audio data stream is combined into a single video data stream.

3. The entertainment system of claim 1, wherein the display data is rendered on the first display monitor and the second display monitor by the media player application executed by each of the first information processing device and the second information processing device, the media player application configured to:
   determine that the display data stream communicated over the network is encrypted;
   request a license in response to a determination that the display data stream is encrypted; and
   render, in response to a receipt of the license, a decrypted display data stream on the first display monitor and the second display monitor of each of the first information processing device and the second information processing device.

4. The entertainment system of claim 3, wherein in response to the display data stream not being encrypted, the display data stream is rendered on the first display monitor of the first information processing device and the second display monitor of the second information processing device without the request for the license.

5. The entertainment system of claim 1, wherein the display data stream is received by the personal electronic device over a remote data link via the network onboard the vehicle from a content delivery network off board the vehicle.

6. The entertainment system of claim 1, wherein the screen sharing application is paired with the screen sharing server of the first information processing device that is configured to:
   receive, from the screen sharing application, a passenger data that relates to the passenger;
   transmit the passenger data to a central server located in the vehicle, wherein the central server is configured to validate the passenger data against a passenger manifest stored on the central server; and
   transmit, to the screen sharing application, a confirmation that pairs the screen sharing application with the screen sharing server of the first information processing device after the passenger data is successfully validated against the passenger manifest.

7. The entertainment system of claim 1, wherein the display link request is received from the first information processing device.

8. The entertainment system of claim 1, wherein the display data stream rendered on the second display monitor is forwarded to the screen sharing server of the second information processing device by the screen sharing server of the first information processing device.

9. A first display monitor system located in a first seat in a vehicle for sharing a display of a personal electronic device, the system comprising:
   a data processor;
   a display device;
   a wireless network interface controller for establishing a wireless communications link with the personal electronic device;
   wherein the data processor, upon execution, is configured to:

establish a pairing with the personal electronic device upon an exchange of a pairing request and a confirmation response with the personal electronic device; and receive, in response to the established pairing, a display data stream from the personal electronic device over the wireless communications link in response to a request from the personal electronic device, send, to a second display monitor system, a display link request to link the second display monitor system to the first display monitor system,
   wherein the display link request specifies that a second seat in the vehicle is associated with the second display monitor system, and
   wherein the first display monitor system is located in the first seat adjacent to and on a same row as that of the second seat that includes the second display monitor system; and receive, from the second display monitor system via a user interface and in response to a displayed prompt, an affirmative confirmation to link the second display monitor system with the first display monitor system, wherein the affirmative confirmation indicates an acceptance of a linking between the second display monitor and the first display monitor; and render the display data stream on the display device of the first display monitor system, wherein the display data stream is forwarded by the first display monitor system to the second display monitor system to be displayed on a second display device of the second display monitor system after the second display monitor system is linked with the first display monitor system.

10. The first display monitor system of claim 9, wherein the pairing between the first display monitor system and the personal electronic device is established by the data processor of the first display monitor system, wherein the data processor is configured to:
   display, on the display device, a query to confirm that the first display monitor system is to be paired with the personal electronic device; and
   receive, via the display device and after the query is displayed, the confirmation response that affirms the pairing request.

11. The first display monitor system of claim 9, wherein the pairing between the first display monitor system and the personal electronic device is established by the data processor of the first display monitor system, wherein the data processor is configured to:
   receive, from the personal electronic device, a passenger data that relates to a passenger;
   transmit the passenger data to a central server that stores a passenger manifest, wherein the central server is configured to validate the passenger data against the passenger manifest stored on the central server; and
   transmit, to the personal electronic device, the confirmation response, wherein the confirmation response is generated based upon a correlation of the passenger data to the passenger manifest.

12. The first display monitor system of claim 9, wherein the display data stream is rendered on the display device by the data processor configured to:
   determine that the display data stream is encrypted;
   request a license in response to a determination that the display data stream is encrypted; and
   render, in response to a receipt of the license, a decrypted display data stream on the display device.

13. The first display monitor system of claim 12, wherein in response to the display data stream not being encrypted, the display data stream is rendered on the display device without the request for the license.

14. A method for sharing a display from a personal electronic device to one or more display monitors installed in a vehicle, the method comprising:
   establishing, by a first display monitor located in a first seat in the vehicle, a pairing with the personal electronic device upon an exchange of a pairing request and a confirmation response with the personal electronic device;
   receiving, by the first display monitor and in response to the established pairing, a display data stream from the personal electronic device;
   sending, by the first display monitor to a second display monitor, a display link request to link the second display monitor to the first display monitor,
      wherein the display link request specifies that a second seat is associated with the second display monitor, and
      wherein the second seat is adjacent to and on a same row as that of the first seat;
   receiving, from the second display monitor via a user interface and in response to a displayed prompt, an affirmative confirmation to link the second display monitor with the first display monitor, wherein the affirmative confirmation indicates an acceptance of a linking between the second display monitor and the first display monitor; and
   rendering the display data stream on a first display device of the first display monitor, wherein the display data stream is forwarded by the first display monitor to the second display monitor to be displayed on a second display device of the second display monitor after the second display monitor is linked with the first display monitor.

15. The method of claim 14, wherein the pairing between the first display monitor and the personal electronic device is established by:
   displaying, on the first display device, a query to confirm that the first display monitor is to be paired with the personal electronic device; and
   receiving, via the first display device and after the query is displayed, a confirmation response that affirms the pairing request.

16. The method of claim 14, wherein the pairing between the first display monitor and the personal electronic device is established by:
   receiving, from the personal electronic device, a passenger data that relates to a passenger;
   transmitting the passenger data to a central server that stores a passenger manifest, wherein the central server is configured to validate the passenger data against the passenger manifest stored on the central server; and
   transmit, to the personal electronic device, the confirmation response, wherein the confirmation response is generated based upon a correlation of the passenger data to the passenger manifest.

17. The method of claim 14, wherein the display data is rendered on the first display device by:
   determining that the display data stream is encrypted;
   requesting a license in response to a determination that the display data stream is encrypted; and
   rendering, in response to a receipt of the license, a decrypted display data stream on the first display device.

18. The method of claim 17, wherein in response to the display data stream not being encrypted, the display data stream is rendered on the first display device without performing the requesting for the license.

* * * * *